(12) United States Patent
Enokijima et al.

(10) Patent No.: US 9,290,111 B2
(45) Date of Patent: Mar. 22, 2016

(54) GEARBOX BRACKET AND POWER SEAT SLIDING DEVICE

(71) Applicant: SHIROKI CORPORATION, Fujisawa-shi, Kanagawa (JP)

(72) Inventors: Tomohiro Enokijima, Kanagawa (JP); Toshiharu Ito, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 80 days.

(21) Appl. No.: 14/368,534

(22) PCT Filed: Jan. 24, 2013

(86) PCT No.: PCT/JP2013/051451
§ 371 (c)(1),
(2) Date: Jun. 25, 2014

(87) PCT Pub. No.: WO2013/111816
PCT Pub. Date: Aug. 1, 2013

(65) Prior Publication Data
US 2014/0339392 A1    Nov. 20, 2014

(30) Foreign Application Priority Data

Jan. 24, 2012  (JP) ................................. 2012-011898

(51) Int. Cl.
*B60N 2/06* (2006.01)
*B60N 2/07* (2006.01)
(Continued)

(52) U.S. Cl.
CPC ............ *B60N 2/0722* (2013.01); *B60N 2/0224* (2013.01); *B60N 2/0232* (2013.01);
(Continued)

(58) Field of Classification Search
CPC ................. B60N 2/067; B60N 2/0232; B60N 2002/024; F16H 25/20; F16H 55/22
USPC ......... 248/424, 429, 422; 74/89.23, 425, 428, 74/458, 640; 296/65.13, 65.15; 297/344.1
See application file for complete search history.

(56) References Cited

U.S. PATENT DOCUMENTS 7,048,244 B2 * 5/2006 Hauck .................. B60N 2/0232
248/430
7,597,303 B2 * 10/2009 Kimura .................. B60N 2/067
248/424
(Continued)

FOREIGN PATENT DOCUMENTS

JP   2003-320873 A   11/2003
JP   2004-352081 A   12/2004
(Continued)

OTHER PUBLICATIONS

International Search Report for the Application No. PCT/JP2013/051451 mailed Apr. 2, 2013.

*Primary Examiner* — Tan Le
(74) *Attorney, Agent, or Firm* — Cheng Law Group, PLLC

(57) ABSTRACT

A gearbox bracket and a power seat sliding device are provided at low cost. A base part 351 includes a main body part 353 configured to support a gearbox 331, and a first protruding part 355 and a second protruding part 357 continuously connected to the main body part 353 and protruding in the direction of the output shaft. A side portion of the first protruding part 355 and a side portion of a first mounting part 371 are connected by a first vertical wall part 361 and a second vertical wall part 363. A side portion of the second protruding part 357 and a side portion of a second mounting part 373 are connected by a third vertical wall part 365 and a fourth vertical wall part 367.

8 Claims, 6 Drawing Sheets

(51) Int. Cl.
*F16H 25/20* (2006.01)
*F16H 55/22* (2006.01)
*F16M 13/02* (2006.01)
*B60N 2/02* (2006.01)

(52) U.S. Cl.
CPC .............. *B60N 2/067* (2013.01); *F16H 25/20* (2013.01); *F16H 55/22* (2013.01); *F16M 13/02* (2013.01); *B60N 2002/024* (2013.01)

(56) References Cited

U.S. PATENT DOCUMENTS

| | | | |
|---|---|---|---|
| 8,226,063 B2* | 7/2012 | Weber | B60N 2/067 248/429 |
| 9,145,068 B2* | 9/2015 | Bosecker | B60N 2/067 |
| 2004/0206195 A1* | 10/2004 | Landskron | B60N 2/067 74/89.14 |
| 2005/0126333 A1 | 6/2005 | Dohles et al. | |
| 2010/0320352 A1* | 12/2010 | Weber | B60N 2/067 248/429 |

FOREIGN PATENT DOCUMENTS

| | | |
|---|---|---|
| JP | 2005-517868 A | 8/2005 |
| JP | 2009-12588 A | 1/2009 |
| JP | 2009-179203 A | 8/2009 |
| WO | WO-03/068551 A1 | 8/2003 |

* cited by examiner

GEARBOX BRACKET AND POWER SEAT SLIDING DEVICE

TECHNICAL FIELD

The present invention relates to a bracket configured to mount a gearbox on a rail of a power seat sliding device, and a power seat sliding device having the bracket.

BACKGROUND ART

FIG. 8 illustrates an example of a power seat sliding device for sliding a seat forwards and backwards by a motor.

In the figure, a lower rail 1 is provided with a threaded rod 3 disposed in a longitudinal direction using a bracket 4 in a state where the threaded rod 3 is prevented from rotation.

A gearbox 5 is disposed on an upper rail 7 using a bracket 6. In the gearbox 5, a nut member is rotatably disposed. The nut member has an inner peripheral surface in which a female thread is formed and threadably engaged with the threaded rod 3. In the gearbox 5, a worm is also disposed. The worm can be rotatively driven by a motor. Further, the outer periphery of the nut member forms a worm wheel with which the worm is threadably engaged.

In this structure, when the motor runs, the nut member is rotated via the worm in the gearbox 5. The threaded rod 3, which is threadably engaged with the nut member, is prevented from rotation. Thus, the upper rail 7 moves relative to the lower rail 1.

As illustrated in FIG. 9, the gearbox 5 includes a first parallel face (lower face in this FIG. 5b parallel to an output shaft 5a, a second parallel face (upper face in this FIG. 5c parallel to the first parallel face 5b, a first orthogonal face (front face in this FIG. 5d orthogonal to the output shaft 5a, and a second orthogonal face (rear face in this FIG. 5e parallel to the first orthogonal face 5d.

The bracket 6 configured to mount the gearbox 5 on the upper rail 7 is formed by bending a plate member. The bracket 6 includes a base part 6a, a first bent part 6b, a second bent part 6c, a first mounting part 6d, and a second mounting part 6e. The base part 6a supports the first parallel face 5b of the gearbox 5. The first bent part 6b is bent from the base part 6a, which is on the side of the first orthogonal face 5d of the gearbox 5, faces the first orthogonal face 5d of the gearbox 5, and extends toward the upper rail 1. The first bent part 6b has a hole 6f through which a threaded rod penetrates. The second bent part 6c is bent from the base part 6a on the side of the second orthogonal face 5e of the gearbox 5, and extends toward the upper rail 1 along the second orthogonal face 5e of the gearbox 5. The second bent part 6c has a hole 6g through which a threaded rod penetrates. The first mounting part 6d is bent from the end of the first bent part 6b in a direction away from the first orthogonal face 5d of the gearbox 5 in parallel with the base part 6a. The first mounting part 6d is attached to the upper rail 1. The second mounting part 6e is bent from the end of the second bent part 6c in a direction away from the second orthogonal face 5e of the gearbox 5 in parallel with the base part 6a. The second mounting part 6e is attached to the upper rail 1 (see, for example, Patent Document 1).

CITATION LIST

Patent Literature

Patent Document 1: JP 2003-320873 A

DISCLOSURE OF THE INVENTION

Problems to be Solved by the Invention

However, the bracket in the form as illustrated in FIGS. 8 and 9, which is formed of a bent plate member, tends to be deformed into a shape as illustrated in FIG. 10 when a load in a seat sliding direction (load in a direction of the output shaft 5a of the gearbox 5) acts on the upper rail 1. This is because the first bent part 6b and the second bent part 6c have small widths in the seat sliding direction, and therefore results in poor bending strength of the bent portion between the first bent part 6b and the first mounting part 6d, the bent portion between the second bent part 6c and the second mounting part 6e, the bent portion between the first bent part 6b and the base part 6a, and the bent portion between the second bent part 6c and the base part 6a.

In order to prevent such deformation, some measures have been taken including use of a thicker plate or a material of a plate having higher strength for the bracket 6, causing a problem of higher costs.

The present invention has been developed in view of the problem described above. An object of the present invention is to provide a gearbox bracket and a power seat sliding device at low costs.

Solutions to the Problems

To obtain at least one of the above objects, a gearbox bracket reflecting an aspect of the present invention includes: a main body part configured to support a gearbox and extending in a direction of an output shaft of the gearbox; a first protruding part continuously connected to the main body part and extending in one direction of the direction of the output shaft; a second protruding part continuously connected to the main body part and extending in another direction of the direction of the output shaft; a first vertical wall part extending from the first protruding part; a second vertical wall part extending from the first protruding part and configured to cooperate with the first vertical wall part to sandwich the output shaft therebetween with respective clearances; a third vertical wall part extending from the second protruding part; a fourth vertical wall part extending from the second protruding part and configured to cooperate with the third vertical wall part to sandwich the output shaft therebetween with respective clearances; a first mounting part linking a top of the first vertical wall part and a top of the second vertical wall part, and extending away from the main body part in a direction along the output shaft; and a second mounting part linking a top of the third vertical wall part and a top of the fourth vertical wall part, and extending away from the main body part in a direction along the output shaft.

To obtain at least one of the above objects, a power seat sliding device reflecting an aspect of the present invention includes: a first rail disposed on one of a floor side and a seat side; a second rail disposed on the other of the floor side and the seat side; a threaded rod disposed along the first rail; a nut member, disposed on the second rail, with which the threaded rod is threadably engaged; a gearbox configured to be driven by a motor and to rotatively drive one of the threaded rod and the nut member; and a bracket configured to mount the gearbox on the first rail when the threaded rod is rotatively driven by the gearbox while configured to mount the gearbox on the second rail when the nut member is rotatively driven by the gearbox. In the power seat sliding device, when one of the threaded rod and the nut member is rotated, rotation of the other is prevented, and the bracket includes: a main body part configured to support a gearbox and extending in a direction of an output shaft of the gearbox; a first protruding part continuously connected to the main body part and extending in one direction of the direction of the output shaft; a second protruding part continuously connected to the main body part and extending in another direction of the direction of the output shaft; a first vertical wall part extending from the first protruding part; a second vertical wall part extending from the first protruding part and configured to cooperate with the first vertical wall part to sandwich the output shaft therebetween with respective clearances; a third vertical wall part extending from the second protruding part; a fourth vertical wall part extending from the second protruding part and configured to cooperate with the third vertical wall part to sandwich the output shaft therebetween with respective clearances; a first mounting part linking a top of the first vertical wall part and a top of the second vertical wall part and extending away from the main body part in a direction along the output shaft; and a second mounting part linking a top of the third vertical wall part and a top the fourth vertical wall part, and extending away from the main body part in a direction along the output shaft.

The other features of the present invention will become clearer from the description of the embodiments provided below and the accompanying drawings.

Effects of the Invention

According to the present invention, the length of the first protruding part and the second protruding part of the base part, in a direction of the output shaft of the gearbox, can be set freely. This means that the width of the first to fourth vertical wall parts, in a direction of the output shaft of the gearbox, can be set arbitrarily. Thus, the bending strength of the respective connecting portions between the first to fourth vertical wall parts and the base part, the bending strength of the respective connecting portions between the first and second vertical wall parts and the first mounting part, and the bending strength of the respective connecting portions between the third and fourth vertical wall parts and the second mounting part, can be enhanced. Thus, required bending strength can be achieved without using a thicker plate for the bracket or changing the material of the plate to one having higher strength. Thus, the costs of the gearbox bracket and the power seat track device can be reduced.

DESCRIPTION OF EMBODIMENTS

First Embodiment

Next, embodiments of the present invention will be described using the drawings.

Figure 3:
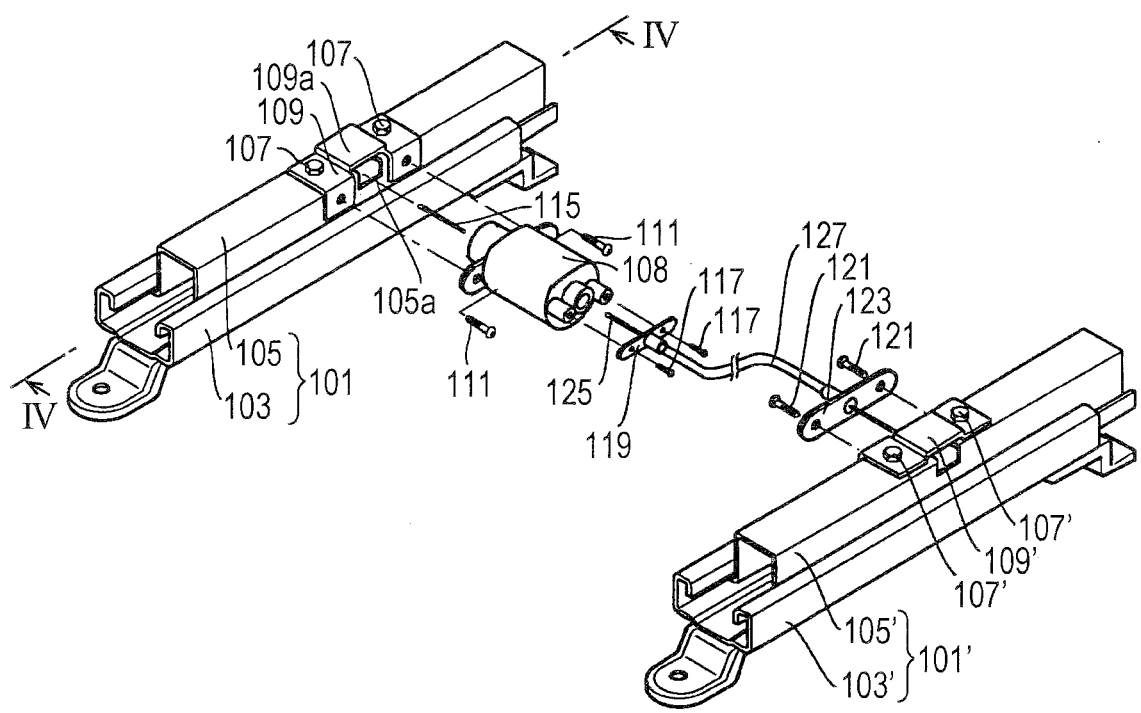
FIG. 3 is a perspective view of a power seat sliding device of a first exemplary embodiment.
Figure 4:
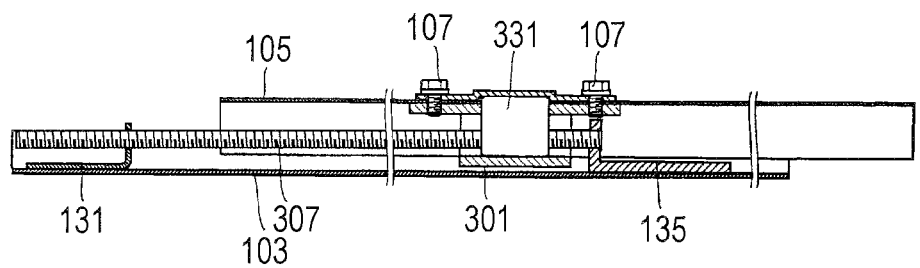
FIG. 4 is a view taken in the direction along an arrow IV in FIG. 3.

First, the overall structure will be described using FIG. 3, which is a perspective view of a power seat sliding device of a first exemplary embodiment, and FIG. 4, which is a view taken in the direction along an arrow IV in FIG. 3. A pair of seat tracks 101 and 101' are disposed on the floor. The seat tracks 101 and 101' are respectively composed of lower rails (second rails) 103 and 103', which are disposed on the floor side, and upper rails (first rails) 105 and 105'. The upper rails 105 and 105' are disposed on the seat side, and are movably engaged with the lower rails 103 and 103'.

The upper rail 105 has a flat upper face. A connection bracket 109 is attached with bolts 107 to substantially the central part of the upper rail 105 in a longitudinal direction thereof. Similarly, the upper rail 105' has a flat upper face. A connection bracket 109' is attached with bolts 107' to substantially the central part of the upper rail 105' in a longitudinal direction thereof.

The connection bracket 109 is provided with a motor (drive source) 108 using screws 111. The motor 108 has an output shaft (not shown) extending toward the seat track 101 and the seat track 101'. A flexible shaft 115 is attached to the output shaft of the motor 108, which extends toward the seat track 101. The flexible shaft 115 transmits rotation of the motor 108 to a gearbox described below, which is disposed on the upper rail 105.

On the face of the motor 108 facing the seat track 101', a bracket 119 is attached with screws 117. Further, on the connection bracket 109' of the upper rail 105' of the seat track 101', a bracket 123 is attached with screws 121. A flexible shaft 125 is attached to the output shaft of the motor 108, which extends toward the seat track 101'. The flexible shaft 125 transmits rotation of the motor 108 to the gearbox described below and disposed on the upper rail 105' described below. One end of the flexible shaft 125 is attached to the bracket 119, and the other end thereof is inserted in a flexible pipe 127 attached to the bracket 123.

Further, the seat track 101 and the seat track 101' have the same structure. Thus, hereinafter, description will be given with the seat track 101, while description of the seat track 101' will be omitted.

In the lower rail 103, a bracket 131 is attached to one end in a longitudinal direction thereof, and a bracket 135 is attached to the other end thereof, respectively. Further, in the lower rail 103, a threaded rod (screw shaft) 307 is disposed in the longitudinal direction thereof. One end of the threaded rod 307 is fixedly attached to the bracket 131, and the other end of the threaded rod 307 is fixedly attached to the bracket 133, respectively. Thus, rotation of the threaded rod 307 (rotation about the shaft in a longitudinal direction) is prevented.

On the other hand, in the upper rail 105, a gearbox 331 is mounted on the substantially central part thereof in the longitudinal direction thereof using a bracket 301.

In the gearbox 331, a nut member, which is formed to have a female thread on the inner peripheral surface so as to be threadably engaged with the threaded rod 307, is rotatably disposed. The gearbox 331 also has a worm therein, which is rotatively driven by the motor 108. Further, the outer periphery of the nut member forms a worm wheel with which the worm is threadably engaged.

The bracket 301 is attached to the upper rail 105 with bolts 107.

When the motor runs, the nut member is rotated via the worm in the gearbox 331. The threaded rod 301 is threadably engaged with the nut member and disposed on the lower rail 103 disposed on the floor. Thus, the upper rail 105, on which the nut member is disposed, moves relative to the lower rail 103.

Figure 1:
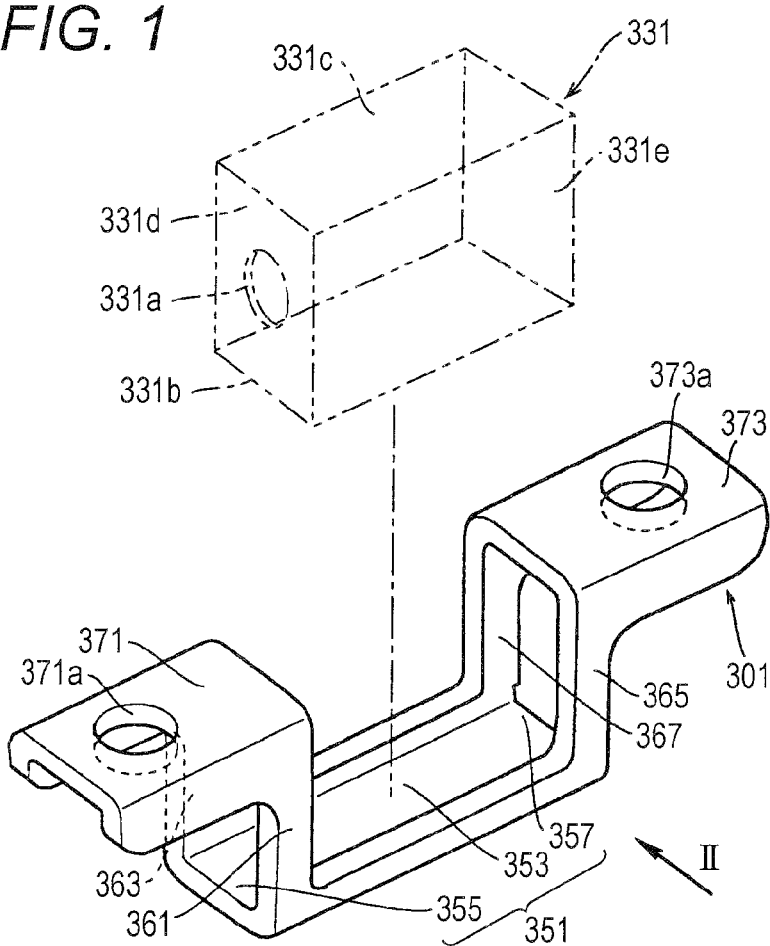
FIG. 1 is a perspective view of a gearbox bracket of a first embodiment.
Figure 2:
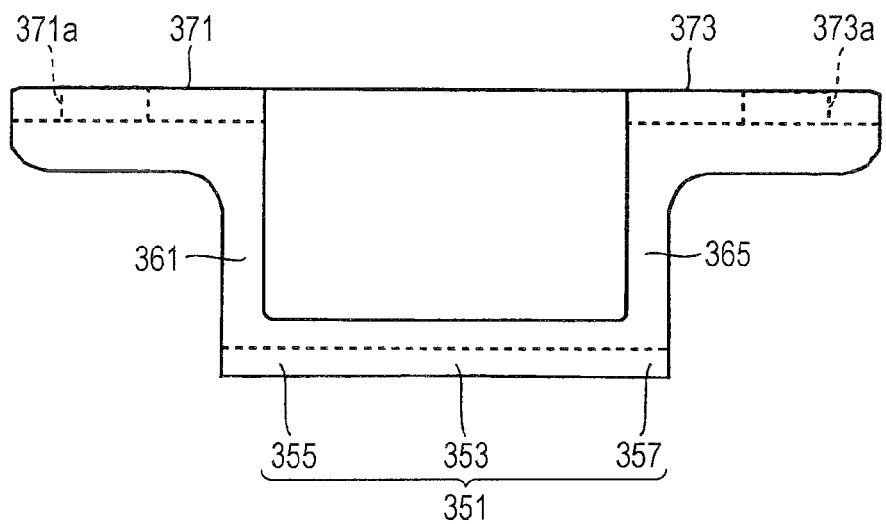
FIG. 2 is a view taken in the direction along an arrow II in FIG. 1.

Next, the bracket 301 will be described using FIG. 1, which is a perspective view of a gearbox bracket of the first embodiment, and FIG. 2, which is a view taken in the direction along an arrow II in FIG. 1.

The gearbox 331 includes a first parallel face 331b parallel to an output shaft 331a, a second parallel face 331c parallel to the first parallel face 331b, a first orthogonal face 331d orthogonal to the output shaft 331a, and a second orthogonal face 331e parallel to the first orthogonal face 331d.

The bracket 301 of the present embodiment mainly consists of a base part, four vertical wall parts, and two mounting parts. The base part supports the gearbox 331. One end of each of the four vertical wall parts is connected to the base part. The four vertical wall parts extend toward the second parallel face 331c of the gearbox 331. The two mounting parts, parallel to the base part, are connected to another end of each of the four vertical wall parts. The two mounting parts are to be attached to the upper rail 105.

A base part 351 of the bracket 301 includes a main body part 353, a first protruding part 355, and a second protruding part 357. The main body part 353 supports the first parallel face 331b of the gearbox 331. The first protruding part 355 is continuously connected to the main body part 353. The first protruding part 355 protrudes from the side of the first orthogonal face 331d of the gearbox 331, in the direction of the output shaft 331a. The second protruding part 357 protrudes from the side of the second orthogonal face 331e of the gearbox 331, in the direction of the output shaft 331a.

The four vertical wall parts of the bracket 301 are configured as described below.

(1) First Vertical Wall Part 361

One end thereof is connected to one side, along the output shaft 331a of the gearbox 331, of the first protruding part 355 of the base part 351. The first vertical wall part 361 faces the first orthogonal face 331d of the gearbox 331, and extends toward the second parallel face 331c.

(2) Second Vertical Wall Part 363

One end thereof is connected to another side, along the output shaft 331a of the gearbox 331, of the first protruding part 355 of the base part 351. The second vertical wall part 363 faces the first orthogonal face 331d of the gearbox 331, and extends toward the second parallel face 331c.

(3) Third Vertical Wall Part 365

One end thereof is connected to one side, along the output shaft 331a of the gearbox 331, of the second protruding part 357 of the base part 351. The third vertical wall part 365 faces the second orthogonal face 331e of the gearbox 331, and extends toward the second parallel face 331c.

(4) Fourth Vertical Wall Part 367

One end thereof is connected to another side, along the output shaft 331a of the gearbox 331, of the second protruding part 357 of the base part 351. The fourth vertical wall part 367 faces the second orthogonal face 331e of the gearbox 331, and extends toward the second parallel face 331c.

The two mounting parts of the bracket 301 are described below.

(1) First Mounting Part 371

The first mounting part 371 is parallel to the base part 351. A side thereof is connected to the other ends of the first vertical wall part 361 and the second vertical wall part 363. The first mounting part 371 extends in a direction away from the first orthogonal face 331d of the gearbox 331. The first mounting part 371 has a fitting hole 371a for inserting the bolt 107.

(2) Second Mounting Part 373

The second mounting part 373 is parallel to the base part 351. A side thereof is connected to the other ends of the third vertical wall part 365 and the fourth vertical wall part 367. The second mounting part 373 extends in a direction away from the second orthogonal face 331e of the gearbox 331. The second mounting part 373 has a fitting hole 373a for inserting the bolt 107.

Figure 5:
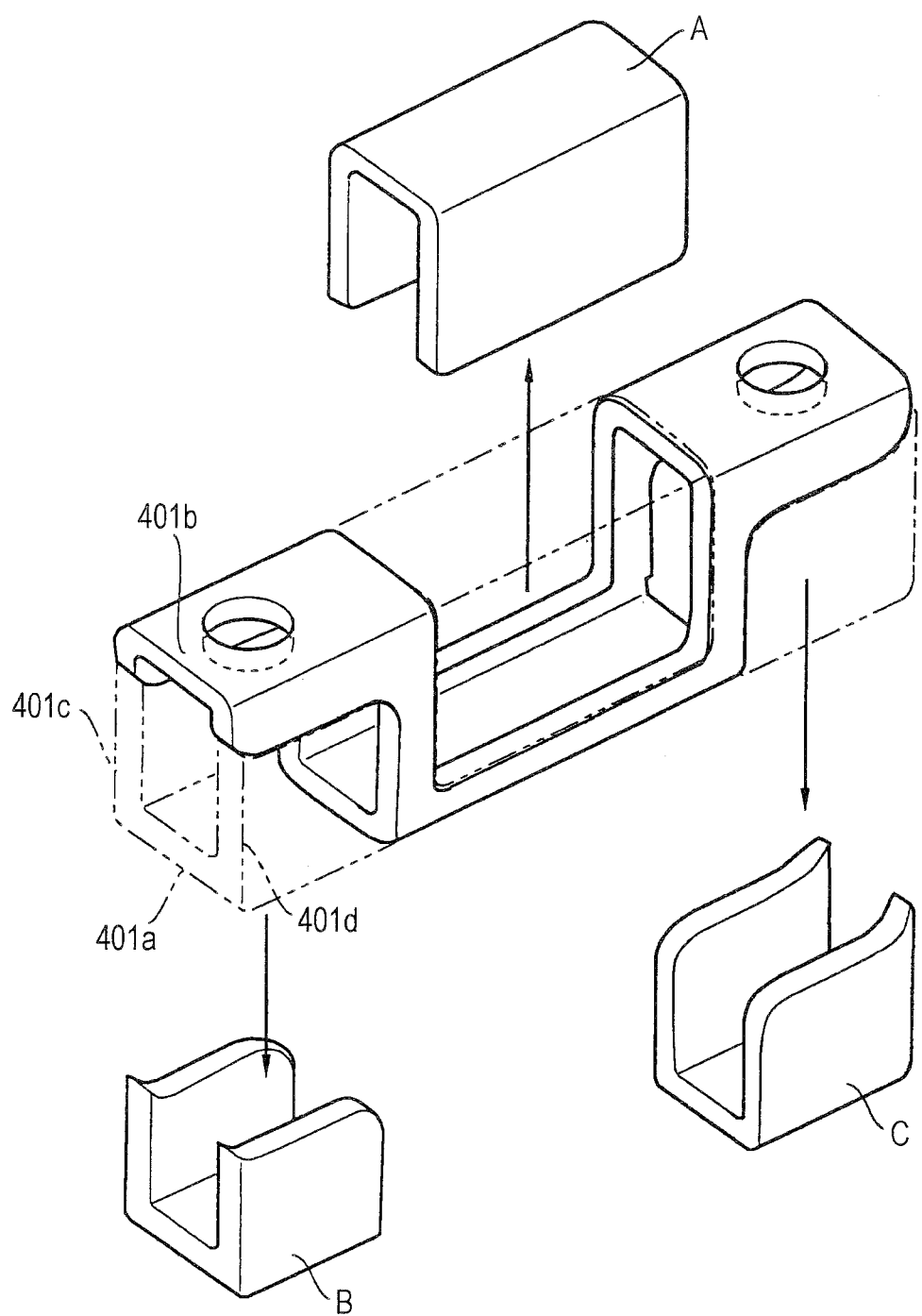
FIG. 5 is a diagram illustrating a method of manufacturing the bracket illustrated in FIG. 1.

A method of manufacturing the bracket 301 of the present embodiment will be described using FIG. 5. The bracket 301 of the present embodiment is made of a square pipe (square cylinder) 401 cut in a given length, having a substantially rectangular cross section. The square pipe 401 includes four parallel faces 401a, 401b, 401c, and 401d, in which the following three portions are cut out.

(A) The face 401b of the square pipe 401 has a central portion with cut-out, and the face 401c and the face 401d of the square pipe 401, which are continued from the face 401b, are partially cut out.

(B) One end side of the face 401a of the square pipe 401 is cut out, and the face 401c and the face 401d continued from the face 401a of the square pipe 401 are partially cut out.

(C) The other end side of the face 401a of the square pipe 401 is cut out, and the face 401c and the face 401d continued from the face 401a of the square pipe 401 are partially cut out.

According to the structure described above, the lengths of the first protruding part 355 and second protruding part 357 of the base part 351 can be freely set in a direction of the output shaft 331a of the gearbox 331. This means that the widths of the first vertical wall part 361, the second vertical wall part 363, the third vertical wall part 365, and the fourth vertical wall part 367 can be arbitrarily set in a direction of the output shaft of the gearbox 331. Thus, it leads to an increase in bending strength of the connecting portion between the base part 351 and each of the first vertical wall part 361, the second vertical wall part 363, the third vertical wall part 365, and the fourth vertical wall part 367; an increase in bending strength of the connecting portion between the first mounting part 371 and each of the first vertical wall part 361 and the second vertical wall part 363; an increase in bending strength of the connecting portion between the second mounting part 373 and each of the third vertical wall part 365 and the fourth vertical wall part 367. Thus, the required bending strength can be achieved without using a thicker plate for the bracket 301 or changing the material of the plate to one having higher strength. The costs of the bracket 301 and the power seat track device can be therefore reduced.

Second Embodiment

Figure 6:
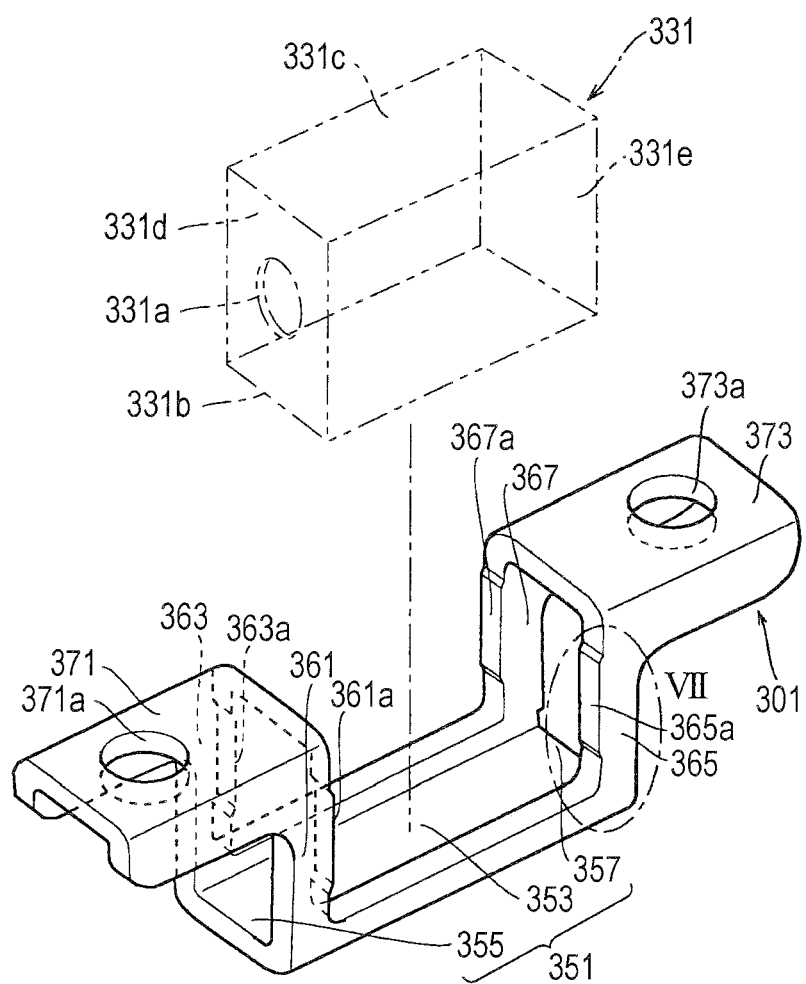
FIG. 6 is a diagram illustrating a second embodiment.
Figure 7:
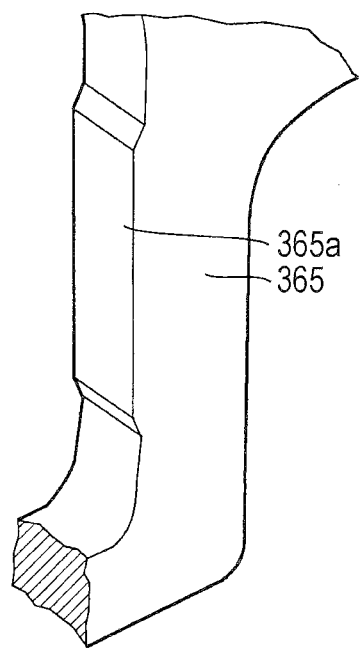
FIG. 7 is an enlarged view of the part VII in FIG. 6.
Figure 8:
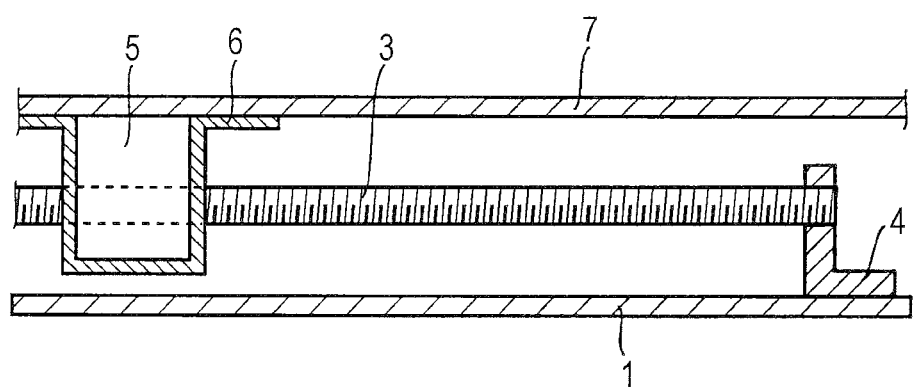
FIG. 8 is a diagram of a power seat track device.
Figure 9:
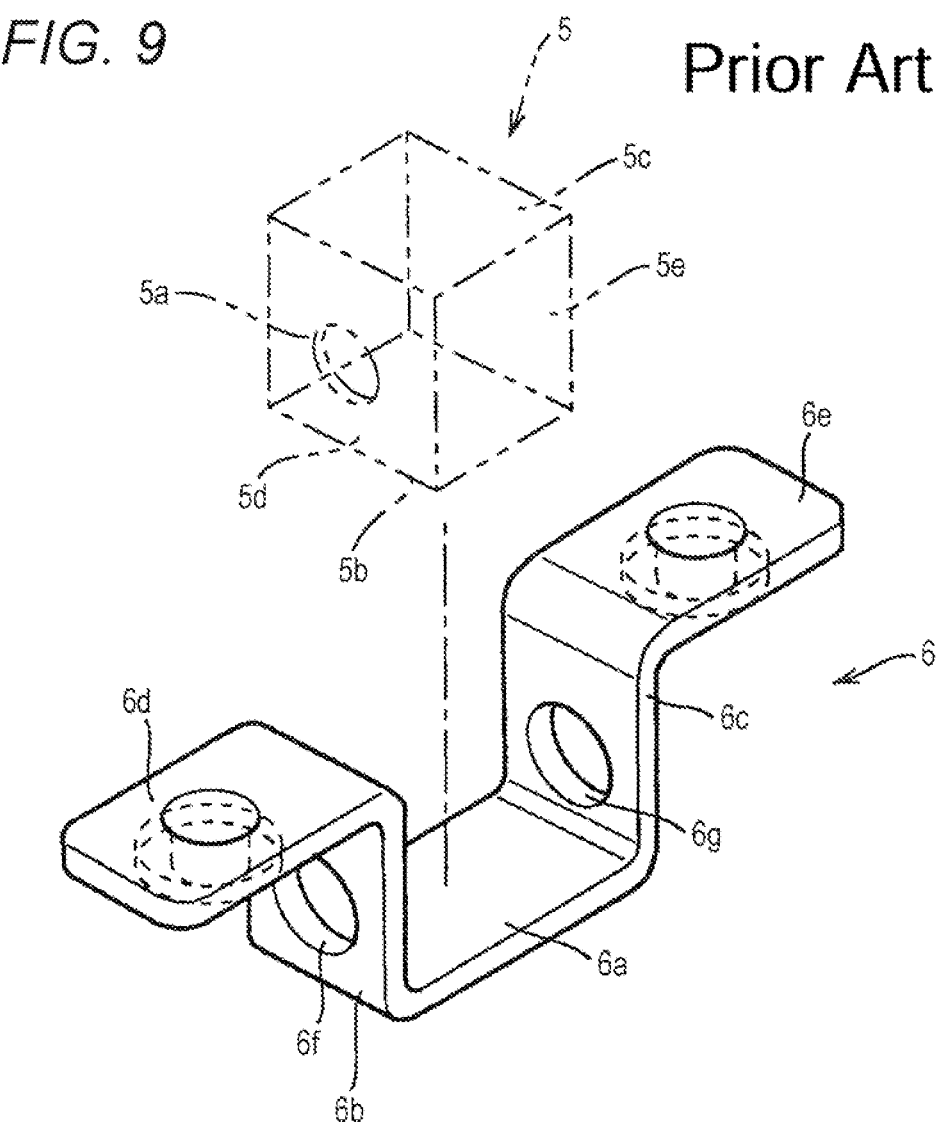
FIG. 9 is a perspective view of a conventional gearbox bracket.
Figure 10:
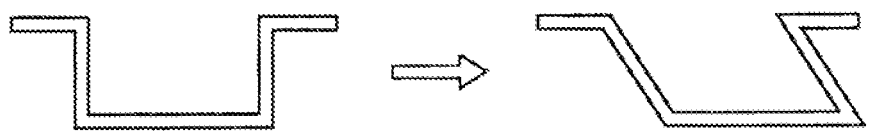
FIG. 10 is a diagram illustrating a problem in the conventional gearbox bracket.

A second embodiment will be described using FIGS. 6 and 7. FIG. 6 is a diagram illustrating a gearbox bracket of the second embodiment. FIG. 6 illustrates the second embodiment. FIG. 7 is an enlarged view of the part VII in FIG. 6. Further, the same part as that illustrated in FIG. 1 illustrating the first embodiment is denoted by the same sign, and the description thereof is not repeated herein.

In FIG. 6, a case covering the internal components of the gearbox 331 is made of an elastic resin material. The first vertical wall part 361, the second vertical wall part 363, the third vertical wall part 365, and the fourth vertical wall part 367 of the bracket 301 have a first protruding portion 361a, a second protruding portion 363a, a third protruding portion 365a, and a fourth protruding portion 367a that are brought into press-contact with the gearbox 331, respectively.

Further, as illustrated in FIG. 7, the third protruding portion 365a of the third vertical wall part 365 has a corner that is chamfered to have an inclined face, with which the gearbox 331 assembled into the bracket 301 is first brought into contact.

In the present embodiment, furthermore, similarly chamfered portions are the protruding portions (the first protruding portion 361a, the second protruding portion 363a, and the fourth protruding portion 367a) of the other vertical wall parts (the first vertical wall part 361, the second vertical wall part 363, and the fourth vertical wall part 367).

By forming such protruding portions (the first protruding portion 361a, the second protruding portion 363a, the third protruding portion 365a, and the fourth protruding portion 367a), the dimensional errors of the gearbox 331 can be absorbed. Therefore, the bracket 301 is able to hold the gearbox 33 reliably without any backlash.

Further, corners of the protruding portions (the first protruding portion 361a, the second protruding portion 363a, the third protruding portion 365a, and the fourth protruding portion 367a) with which the gearbox 331 assembled into the bracket 301 is first brought into contact, are chamfered to have inclined faces. Therefore, the gearbox 33 can be inserted into the bracket 301 easily.

Further, the present invention is not limited to the first and second embodiments described above. In the above-described embodiments, the motor 108 and the gearbox 331 are disposed on the upper rail 105 side, and the threaded rod 307 is disposed on the lower rail 103 side. However, the motor 108 and the gearbox 331 may be disposed on the lower rail side, and the threaded rod 307 may be disposed on the upper rail side.

Further, rotation of the threaded rod is prevented, the nut member threadably engaged with the threaded rod is rotated by the motor, and the nut member moves linearly. However, it is also possible to prevent rotation of the nut member, allow the threaded rod to rotate, and allow the nut member to move linearly.

Further, the material of the bracket is not limited to a square pipe. The bracket may be formed by processing a flat plate.

DESCRIPTION OF REFERENCE SIGNS

301 Bracket
351 Base part
353 Main body part
355 First protruding part
357 Second protruding part
361 First vertical wall part
363 Second vertical wall part
365 Third vertical wall part
367 Fourth vertical wall part
371 First mounting part
373 Second mounting part
331 Gearbox

The invention claimed is:
1. A gearbox bracket comprising:
a main body part configured to support a gearbox and extending in a direction of an output shaft of the gearbox;
a first protruding part continuously connected to the main body part and extending in one direction of the direction of the output shaft;
a second protruding part continuously connected to the main body part and extending in another direction of the direction of the output shaft;
a first vertical wall part extending from the first protruding part;
a second vertical wall part extending from the first protruding part and configured to cooperate with the first vertical wall part to sandwich the output shaft therebetween with respective clearances;
a third vertical wall part extending from the second protruding part;
a fourth vertical wall part extending from the second protruding part and configured to cooperate with the third vertical wall part to sandwich the output shaft therebetween with respective clearances;
a first mounting part linking a top of the first vertical wall part and a top of the second vertical wall part, and extending away from the main body part in a direction along the output shaft; and
a second mounting part linking a top of the third vertical wall part and a top of the fourth vertical wall part, and extending away from the main body part in a direction along the output shaft.

2. The gearbox bracket according to claim 1, wherein
the gearbox has elastic portions facing the first to fourth vertical wall parts of the bracket, and
a protruding portion is formed on at least one of the first to fourth vertical wall parts of the bracket, and configured to be brought into press-contact with the gearbox.

3. The gearbox bracket according to claim 2, wherein corners of the protruding portions of the vertical wall parts are chamfered.

4. A gearbox bracket configured to support a gearbox, the gearbox including a first parallel face parallel to an output shaft, a second parallel face parallel to the first parallel face, a first orthogonal face orthogonal to the output shaft, and a second orthogonal face parallel to the first orthogonal face, the gearbox bracket comprising:
a base part including a main body part configured to support the first parallel face of the gearbox, a first protruding part continuously connected to the main body part and protruding from a side of the first orthogonal face of the gearbox in a direction of the output shaft, and a second protruding part continuously connected to the main body part and protruding from a side of the second orthogonal face of the gearbox in the direction of the output shaft;
a first vertical wall part having one end connected to one side of the first protruding part of the base part along the output shaft of the gearbox, facing the first orthogonal face of the gearbox, and extending toward the second parallel face;
a second vertical wall part having one end connected to another side of the first protruding part of the base part along the output shaft of the gearbox, facing the first orthogonal face of the gearbox, and extending toward the second parallel face;
a third vertical wall part having one end connected to one side of the second protruding part of the base part along the output shaft of the gearbox, facing the second orthogonal face of the gearbox, and extending toward the second parallel face;
a fourth vertical wall part having one end connected to another side of the second protruding part of the base part along the output shaft of the gearbox, facing the second orthogonal face of the gearbox, and extending toward the second parallel face;

a first mounting part disposed in parallel to the base part and having a side portion connected to the other end of the first vertical wall part and the other end of the second vertical wall part, the first mounting part being configured to extend in a direction away from the first orthogonal face of the gearbox; and a second mounting part disposed in parallel to the base part and having a side portion connected to the other end of the third vertical wall part and the other end of the fourth vertical wall part, the second mounting part being configured to extend in a direction away from the second orthogonal face of the gearbox.

5. A power seat sliding device comprising:
a first rail disposed on one of a floor side and a seat side;
a second rail disposed on the other of the floor side and the seat side;
a threaded rod disposed along the first rail;
a nut member, disposed on the second rail, with which the threaded rod is threadably engaged;
a gearbox configured to be driven by a motor and to rotatively drive one of the threaded rod and the nut member; and
a bracket configured to mount the gearbox on the first rail when the threaded rod is rotatively driven by the gearbox while configured to mount the gearbox on the second rail when the nut member is rotatively driven by the gearbox, wherein
when one of the threaded rod and the nut member is rotated, rotation of the other is prevented, and
the bracket includes:
  a main body part configured to support a gearbox and extending in a direction of an output shaft of the gearbox;
  a first protruding part continuously connected to the main body part and extending in one direction of the direction of the output shaft;
  a second protruding part continuously connected to the main body part and extending in another direction of the direction of the output shaft;
  a first vertical wall part extending from the first protruding part;
  a second vertical wall part extending from the first protruding part and configured to cooperate with the first vertical wall part to sandwich the output shaft therebetween with respective clearances;
  a third vertical wall part extending from the second protruding part;
  a fourth vertical wall part extending from the second protruding part and configured to cooperate with the third vertical wall part to sandwich the output shaft therebetween with respective clearances;
  a first mounting part linking a top of the first vertical wall part and a top of the second vertical wall part and extending away from the main body part in a direction along the output shaft; and
  a second mounting part linking a top of the third vertical wall part and a top the fourth vertical wall part, and extending away from the main body part in a direction along the output shaft.

6. The power seat sliding device according to claim 5, wherein
the gearbox includes a first parallel face parallel to an output shaft, a second parallel face parallel to the first parallel face, a first orthogonal face orthogonal to the output shaft, and a second orthogonal face parallel to the first orthogonal face;
the bracket includes
  a base part including the main body part configured to support the first parallel face of the gearbox, the first protruding part continuously connected to the main body part and protruding from a side of the first orthogonal face of the gearbox in a direction of the output shaft, and the second protruding part continuously connected to the main body part and protruding from a side of the second orthogonal face of the gearbox in the direction of the output shaft;
  the first vertical wall part has one end connected to one side, along the output shaft of the gearbox, of the first protruding part of the base part, and is configured to face the first orthogonal face of the gearbox and extend toward the second parallel face;
  the second vertical wall part has one end connected to another side, along the output shaft of the gearbox, of the first protruding part of the base part, and is configured to face the first orthogonal face of the gearbox and extend toward the second parallel face;
  the third vertical wall part has one end connected to one side, along the output shaft of the gearbox, of the second protruding part of the base part, and is configured to face the second orthogonal face of the gearbox and extend toward the second parallel face;
  the fourth vertical wall part has one end connected to another side, along the output shaft of the gearbox, of the second protruding part of the base part, and is configured to face the second orthogonal face of the gearbox and extend toward the second parallel face;
  the first mounting part is disposed in parallel to the base part, has a side portion connected to other end of the first vertical wall part and the other end of the second vertical wall part, and is configured to extend in a direction away from the first orthogonal face of the gearbox, and to be attached to the first rail; and
  the second mounting part is disposed in parallel to the base part, has a side portion of which is connected to other end of the third vertical wall part and the other end of the fourth vertical wall part, and is configured to extend in a direction away from the second orthogonal face of the gearbox, and to be attached to the first rail.

7. The gearbox bracket according to claim 4, wherein
the gearbox has elastic portions facing the first to fourth vertical wall parts of the bracket, and
a protruding portion is formed on at least one of the first to fourth vertical wall parts of the bracket, and configured to be brought into press-contact with the gearbox.

8. The gearbox bracket according to claim 4, wherein
corners of the protruding portions of the vertical wall parts are chamfered.

* * * * *